United States Patent Office 3,111,545
Patented Nov. 19, 1963

3,111,545
DIHALIDES FROM GLYCOLS
John F. Nobis, Wilmette, Ill., and Irving L. Mador and Robert E. Robinson, Cincinnati, Ohio, assignors to National Distillers and Chemical Corporation, New York, N.Y., a corporation of Virginia
No Drawing. Filed Feb. 18, 1960, Ser. No. 9,432
7 Claims. (Cl. 260—652)

This invention relates broadly to new processes for making novel organic dihalides and, more particularly, to organic dichlorides and dibromides and to methods for the preparation of new compositions of matter.

It is an object of this invention to provide new and novel organic dihalides in good yields and purity, utilizing relatively inexpensive and readily available raw materials by novel and heretofore unknown processes therefor.

Other objectives of the invention will become apparent from the detailed description set forth below.

The present process relates to novel organic dihalides that are valuable as intermediates in the preparation of polysulfide polymers. Such polysulfide polymers when used as fuel binding agents in solid propellants for rockets provide numerous advantages over previously known polysulfide polymers in ballistic, physical, and processing characteristics. These include higher fuel value, increased chemical stability over a wide temperature range, improved flexibility, higher tensile strength and elongation, better adhesion, a readily controllable burning rate, and a reduced tendency toward crystallization. In addition, because they are made by a relatively simple process from low cost, readily available raw materials, these polysulfide polymers are themselves inexpensive and readily available.

The novel compounds of the present invention are dihalides obtained from aliphatic, saturated glycols and particularly from mixtures of those glycols containing a major proportion of branched chain glycols having between about 8 and 14 carbon atoms. These novel dihalides may be made by the halogenation of a mixture of glycols which may be prepared from the reaction product of an aliphatic conjugated diolefin with an alkali metal.

It has been found that an aliphatic conjugated diolefin can be treated with an alkali metal such as sodium or potassium, in finely dispersed form, in a selected liquid medium and, if desired, in the presence of a relatively small amount of a polycyclic aromatic hydrocarbon and/or in the presence of a selected solid, friable attrition agent at a temperature preferably below about 0° C. to produce a mixture comprised predominantly of dimetallo derivatives of the dimerized diolefin. This dimetallo product is then treated under selective reaction conditions with a reactant capable of reaction with the dimetallo dimers to yield salts of the corresponding unsaturated glycols. These salts are then "quenched" by the gradual addition of water or an alcohol such as methanol or ethanol to liberate the glycols from their alkali metal derivatives which are initially formed. The mixtures of isomeric glycols are isolated from this reaction mixture by extraction, distillation, or other suitable means.

The glycol products thus derived are subsequently hydrogenated, thereby giving mixtures of crude, saturated glycols comprising both straight chain and branched chain components. By a process which is based on the different degrees of solubility in certain materials of the straight chain component of an isomeric mixture of glycols and the branched chain components, the isomeric mixture of glycols is then substantially separated into its straight chain and branched chain components. In accordance with the present invention, a mixture containing a major proportion of the branched chain component is halogenated to produce unique organic dihalides.

The starting diolefins for this process include any aliphatic conjugated diolefin such as for example, butadiene, isoprene, piperylene, dimethylbutadiene, the hexadienes, and the like. In general, it is desirable to use a conjugated aliphatic diolefin having from 4 to 8 carbon atoms.

Either sodium or potassium can be used as the alkali metal reactant. Sodium is preferred over potassium since it has been found that sodium gives excellent selectivity and yields of dimerized products; also it is cheaper and more readily available. Mixtures containing a major proportion of sodium are also useful.

One factor in the successful production of the initial dimerized derivatives from which the glycols are prepared is the use of the alkali metal in dispersed form. If bulk sodium is used instead of dispersed sodium, it either yields no product or results largely in the formation of highly condensed polymers from the diolefin. These unwanted polymers can be substantially avoided by employing the alkali metal as a dispersion. Such dispersions are most conveniently made in an inert hydrocarbon or ether preliminary to reaction with the diene.

The reaction medium most suitable for reaction of the diolefin with the alkali metal has been found to consist essentially of certain types of ethers. The ether medium can be any aliphatic monoether having a methoxy group in which the ratio of the number of oxygen atoms to the number of carbon atoms is not less than 1:4. Examples include dimethyl ether, methyl ethyl ether, methyl n-propyl ether, methyl isopropyl ether, and mixtures of these methyl ethers. Certain aliphatic polyethers are also satisfactory. These include the acyclic and cyclic polyethers which are derived by replacing all of the hydroxyl hydrogen atoms of the appropriate polyhydric alcohol by alkyl groups. Examples are the ethylene glycol dialkyl ethers such as the dimethyl, methyl ethyl diethyl, methyl butyl, ethyl butyl, dibutyl, and butyl lauryl ethylene glycol ethers; trimethylene glycol dimethyl ether; glycerol trimethyl ether; glycerol dimethyl ethyl ether, and the like. Generally, simple methyl monoethers such as dimethyl ether and the polyethers of ethylene glycol such as ethylene glycol dimethyl ether are preferred. Hydrocarbon solvents such as isooctane, kerosene, toluene, and benzene cannot be used exclusively as the reaction media in the dimerization step, since they adversely affect the dimerization reaction of the diolefin and give little or no yield of dimer products.

The ethers used as reaction media should not contain any groups which are distinctly reactive toward sodium. In addition, the ether used must not be subject to extensive cleavage under the reaction conditions to yield irreversible reaction products during the dimerization process, since such cleavage not only destroys the ether, but also introduces into the reaction system metallic alkoxides which induce undesirable polymer-forming reactions with the diolefins.

Although it is preferred that the reaction medium consist substantially of the ethers specified, other inert liquid media can be present in limited amounts. In general, these inert media are introduced with the alkali metal dispersion as the liquid in which the sodium is suspended. These inert media have the principal effect of diluting the ethers. As such dilution increases, minimum concentration of ether is reached below which the dimerization promoting effect is not evident. It is necessary to maintain the concentration of ether in the reaction mixture at a sufficient level that it will have a substantial promoting effect upon the diolefin dimerization reaction.

It has also been found highly useful to employ in conjuction with the dimerization reaction one or more techniques of activation for the dimerization process. This can be done in a number of ways and has the effect of increasing the rate of reaction and making the reaction more selective. For instance, a relatively small amount of at least one compound of the polycyclic aromatic class can be included in the reaction mixture. Such a compound may be a condensed ring hydrocarbon such as naphthalene or phenanthrene or an uncondensed polycyclic compound such as diphenyl, the terphenyls, dinaphthyl, tetraphenyl ethylene, and the like. The polyphenyl compounds such as diphenyl, the terphenyls, and their mixtures have been found to be particularly useful. Concentrations in the range of 0.1 to 10 weight percent based on the amount of diolefins undergoing dimerization are ordinarily sufficient.

It has also been found advantageous to carry out the dimerization of the diolefin in the presence of at least one solid friable attrition agent. These activating materials have been found especially valuable for increasing the reaction rate where the dimerization is done in attrition-type apparatus such as a ball mill or a pebble mill. These materials can be used either alone or in conjunction with the polycyclic aromatic compounds. Materials which are suitable for use as the solid friable attrition agents include inorganic solids such as alkali metal salts, for example, sodium chloride, sodium sulfate, and potassium sulfate. Also useful is the class of compounds which consists of metallic and non-metallic oxides which are not reactive with metallic sodium under the reaction conditions, for example, sand (silicon dioxide), diatomaceous earth (Celite), zircon, and rutile. Carbon, such as in the form of graphite, can also be used.

It is further highly desirable in the process that the reaction temperature in the dimerization step be held below 0° C. The temperature range between —20° and —50° C. is the preferred one for diolefin dimerization. At higher temperatures the ether diluents tend to yield cleavage products with the result that sufficient alkoxide by-products are formed to yield high molecular weight polymer products.

In the second step of the reaction, the dimerized product is treated with any suitable reactant to form the corresponding glycol, such as oxygen. Oxidizing agents may also be used. The dimerized product may also be treated with a suitable carbonyl compound such as an aldehyde, a ketone, or an organic ester, and mixtures thereof; specific examples include aliphatic aldehydes such as formaldehyde, paraformaldehyde, acetaldehyde, propionaldehyde, butyraldehyde, isobutyraldehyde, and the octylaldehydes such as 2-ethylhexaldehyde; aromatic and heterocyclic aldehydes such as benzaldehyde and furfural, salicylaldehyde, anisaldehyde, cinnamaldehyde, piperonal, vanillin, acrolein, and crotonaldehyde; ketones such as acetone, methyl ethyl ketone, diethyl ketone, acetophenone, benzophenone, methyl vinyl ketone, mesityl ketone, phorone, and benzoquinone. It is also possible to react the dimerized product with any appropriate aliphatic or aromatic epoxide, such as ethylene oxide, propylene oxide, a butylene oxide, or styrene oxide, or the reactant may be an epoxide derivative of a diene, such as butadiene epoxide or isoprene epoxide.

The reaction of the dimetallic diene compounds with one of the above reactants or mixture thereof is preferably carried out at a temperature below about +50° C., and preferably in the range of about —50° to 0° C.

While proportions of the various reactants are not critical, optimum yields of the dimetallic diene intermediate can be obtained only if the alkali metal is present in finely dispersed form and in amounts equivalent to or slightly in excess of the molecular equivalents of the diolefin employed. The same relative ratio of reactants is also effective in the reaction of the dimeric derivative with an epoxide or carbonyl compound or the like, with the restriction that a least two equivalents of the glycol-forming reactant are required for each molecule of dimetallic dimer.

Depending upon the reactants employed, a wide variety of glycol mixtures containing both branched chain and straight chain components may be obtained. For example, where the initial reactants are butadiene and sodium and the glycols are prepared by using ethylene oxide, there results a mixture of $C_{12}$ unsaturated glycols; after hydrogenation, the saturated glycols obtained include the straight chain glycol, 1,12-dodecanediol, and the branched chain glycols, 3,6-diethyl-1,8-octanediol and 3-ethyl-1,10-decanediol. With formaldehyde, there results a mixture of $C_{10}$ unsaturated glycols; after hydrogenation, the saturated $C_{10}$ glycols obtained include the straight chain glycol, 1,10-decanediol, and the branched chain glycols, 2,5-diethyl-1,6-hexanediol and 2-ethyl-1,8-octanediol. When other diolefins are used for the initial reaction, such as isoprene, dimethylbutadiene, pentadienes, and the like, the final products will vary accordingly. Such a crude glycol mixture is generally composed primarily of $C_8$–$C_{14}$ straight and branched chain glycols and may contain also relatively small amounts of impurities such as hydrogenation catalyst; monohydric alcohols; polymeric glycols and alcohols; unsaturated acids, hydrocarbons, and other materials which may have passed through the hydrogenation step without being hydrogenated; and the like.

Solid impurities may be removed by filtering or centrifuging the crude mixture of glycols. Distillation of the crude mixture of glycols before hydrogenation, after hydrogenation, or both before and after hydrogenation serves to remove most of the lower boiling hydrocarbon, monohydric, and polymeric impurities.

By a process based on the different solubilities of straight chain glycols and their branched chain isomers in selected solvents, the crude mixtures of aliphatic, saturated, isomeric glycols are then separated into their substantially pure straight chain and branched chain components or fractions. For example, a crude mixture of $C_{12}$ glycols may be separated into the straight chain glycol, 1,12-dodecanediol, and a mixture of branched chain glycols comprising 3,6-diethyl-1,8-octanediol and 3-ethyl-1,10-decanediol. In practice of this invention, the mixture subjected to halogenation comprises up to about 20 percent of the straight chain glycol, preferably no more than about 15 percent, and the remainder and major portion a mixture of branched chain glycols containing varying amounts of isomers with from one to four side chains.

The novel dihalides of this invention are prepared by the halogenation, with or without a catalyst, of a mixture of aliphatic, saturated $C_8$–$C_{14}$ glycols containing a major proportion of branched chain glycols. A study of the structures indicates that the halogenation of such a mixture of saturated $C_{12}$ glycols, for example, yields essentially the following products, an X being used to symbolize a halogen atom:

| | Percent |
|---|---|
| $X(CH_2)_7CHCH_2CH_2X$<br>　　　　$\|$<br>　　　　$C_2H_5$<br><br>$XCH_2CH_2CHCH_2CH_2CHCH_2CH_2X$<br>　　　　$\|$　　　　$\|$<br>　　　　$C_2H_5$　　$C_2H_5$ | 95–80 |
| $X(CH_2)_{12}X$ | 5–20 |

To prepare the dihalides of the present invention, for example, a mixture of aliphatic, saturated glycols containing a major proportion of branched chain glycols, such as a mixture prepared by the aforedescribed process, is reacted with a halogenating agent, either alone or in the presence of a halogenation catalyst. The reaction mixture is then agitated, preferably under reflux, cooled to about room temperature, and water is added with external cooling of the mixture to about 10°–20° C., whereupon separation into two layers occurs. The dihalide-containing layer is separated from the water layer, washed, dried, and distilled under reduced pressure. In an alternative procedure, the mixture of glycols is mixed with a halogenating agent, with or without a catalyst, at about 10°–20° C. After standing overnight at room temperature, the reaction mixture is heated under reflux for several hours. It is then cooled to room temperature and subsequently treated with water with external cooling to about 10°–20° C., whereupon separation into two layers occurs. The dihalide layer is separated from the water layer, washed, dried, and distilled. The mixture of new and novel organic dihalides is thus separated and recovered in substantially high yield and high purity.

This mixture of new dihalides may then be converted into the corresponding polysulfides by treatment with sulfur or a sufur-containing compound, such as an alkaline polysulfide or an alkali earth polysulfide.

The halogenating agent of the present invention may be any convenient material such as concentrated hydrochloric acid, thionyl chloride, phosphorous trichloride, sulfuryl chloride, phosphorous tribromide, and the like. The appropriate halogenation conditions vary with each compound selected. For example, when hydrochloric acid is used, the mole ratio of halogenating agent to glycol may range from about 2:1 to 10:1, and is preferably about 4:1 to 6:1; the reaction takes place at a temperature between about room temperature and 200° C., and preferably at reflux temperature of the system, i.e., about 90–110° C.; the catalyst may be a metal chloride, such as the chloride of zinc, mercury, iron, etc. When the halogenating agent is $SOCl_2$, its mole ratio to glycol ranges from about 2:1 to 10:1, and is preferably about 4:1 to 6:1, the reaction takes place at a temperature ranging from about room temperature to 200° C., and preferably at reflux temperature of the system, i.e., about 100–130° C.; in this case the catalyst may be a compound such as pyridine, dimethylaniline, trimethylamine, and the like. When phosphorous tribromide is employed as the halogenating agent, the mole ratio of $PBr_3$ to glycol is about 2:1 to 10:1, and preferably about 2.2:1 to 4:1; the reaction temperature is about 0–50° C., and preferably about 20–30° C.; no catalyst is required.

The dihalides can also be conveniently made by reacting glycols with gaseous hydrogen halides such as hydrogen chloride at from 100 to 150° C. in the presence of catalytic amounts of zinc chloride or the like.

For example, a highly satisfactory and practical method for converting these long chain glycols and mixtures of glycols to dihalides, i.e., dichlorides, is by using anhydrous hydrogen chloride and catalytic amounts of zinc chloride in an anhydrous system. Only catalytic amounts of zinc chloride are necessary, and amounts as small as 0.01 mole per mole of glycol converted have been found effective. It is preferred to use $<0.1$ mole of the catalyst, i.e., zinc chloride, per mole of hydroxyl.

In such a case, hydrogen chloride can be passed upward through a tower with the carrier and a catalyst, e.g. zinc chloride, aluminum chloride, or some other halogenation catalyst. This would provide a continuous, counter-current reaction between the glycol and the halogenating agent.

The rubbery polysulfide polymers prepared from the herein described glycols have improved low temperature characteristics and a broad useful temperature range. These polysulfide rubbers generally have found widespread use in aviation and military applications, in flexible fuel hose and wing tank sealers, as well as in many other uses. Another important use of these polysulfide polymers is in the solid propellant field where heavily loaded cured propellant must withstand shock at low temperatures without cracking. The rubbery polysulfide polymers from the herein-described glycols have unexpectedly and surprisingly been found to retain flexibility over long periods of time at low temperatures and yet also retain good high temperature characteristics. They are definitely non-hardening polysulfides. Examples have been tested and found to withstand hardening at −40° C. for 3600 hours. These polysulfides have also been found to withstand high temperatures for relatively long periods of time. Thus, they are wide temperature range rubbery polymers.

The reaction required to produce the polymers from these novel dihalides is the well-known reaction for polysulfide production from organic primary dihalides.

The sulfurizing agent used to produce the polymers may be sulfur or any suitable sulfide such as, for example, one having the general formula $MS_{2-6}$ where S is sulfur and M is an alkali or alkaline earth metal, substituted ammonium, ammonium, etc.

In addition to their use as starting materials for polysulfides and derivatives thereof, the novel dihalides of the present invention are especially good starting materials for synthetic waxes and polishes and for synthetic lubricants. Also they may be reacted with sodium cyanide to form dinitriles; with ammonia to form diamines; with sodium and carbon dioxide to form diacids; with sodiomalonic ester to form tetraacid esters. They are useful also as solvents and in the formation of cyclic compounds.

Although the process of the present invention will be illustrated essentially in relation to the preparation of dichlorides and dibromides of a mixture of aliphatic saturated $C_{12}$ glycols containing a major proportion of branched chain glycols, to the preparation of dichlorides of a mixture of $C_{10}$ glycols, and to the application of $C_{12}$ glycol dichlorides in the preparation of a polysulfide polymer, it is not intended that the present invention be limited to the dichlorides or dibromides of such a mixture. This invention is applicable equally to the preparation of the dichlorides, the dibromides, and the diiodides of any mixture of aliphatic saturated branched chain $C_8$–$C_{14}$ glycols, of aliphatic saturated straight chain $C_8$–$C_{14}$ glycols, and of mixtures of aliphatic saturated straight chain and branched chain $C_8$–$C_{14}$ glycols.

The more detailed practice of the present invention is illustrated by the following examples wherein parts are given by weight unless otherwise specified. These examples are illustrative only and are not intended to limit the invention in any way except as indicated by the appended claims.

*Example I*

Disodiooctadiene was prepared from 3.0 moles of butadiene and 3.0 gram atomic weights of sodium in dimethyl ether reaction medium. The reaction was carried out by initially preparing finely divided sodium dispersion in isooctane and contacting the dispersion in the presence of the dimethyl ether reaction medium with butadiene in the presence of about 1 to 2 percent of terphenyl. A temperature of about −23° C. was used. About 1.2 moles of disodiooctadiene resulted from this reaction. When this initial reaction was complete, 3.0 moles of gaseous ethylene oxide were admitted to the mixture over a two-hour period while maintaining a reaction temperature of about −30° C. by refluxing the dimethyl ether. The disodium salts of the resulting $C_{12}$ glycols were treated with methanol and then with water to destroy any unreacted sodium and to liberate the unsaturated glycols from the corresponding sodium alkoxides. The layers were separated and the inert solvents removed from the organic layer. A mixture of 287 parts of the unsaturated $C_{12}$ glycols and 350 parts of water was hydrogenated in a hydrogenation bomb at 300 p.s.i.g. over a nickel catalyst. The resulting saturated $C_{12}$ glycols, comprising the straight chain glycol, 1,12-dodecanediol, and the branched chain glycols, 3,6-diethyl-1,8-octanediol and 3-ethyl-1,10-decanediol, were then washed from the bomb 200 parts of methanol, and the mixture was filtered to remove the catalyst. After removal of the methanol and water, 239 parts of saturated glycols were obtained. This crude mixture was treated alternately with a solvent in which the straight chain glycol fraction is relatively insoluble and the branched chain glycol fraction is relatively soluble and with a solvent in which the branched chain glycol fraction is relatively insoluble, thus selectively separating the straight chain glycol from the branched chain glycols in relatively pure form. One hundred parts (0.99 mole) of the resulting branched chain fraction (containing approximately 20% of 3,6-diethyl-1,8-octanediol, 70% of 3-ethyl-1,10-decanediol, and 10% of 1,12-dodecanediol) and about 10.0 parts of pyridine were charged into a three-necked reaction flask equipped with a paddle-type stirrer, dropping funnel, and thermometer. With stirring, 144 parts (2.0 moles) of thionyl chloride were added gradually to the reaction flask via the dropping funnel, the temperature being held at about 10°–20° C. by external cooling. The mixture was allowed to stand overnight at room temperature, i.e., about 20°–30° C., and then heated under reflux for several hours. After cooling to room temperature, the mixture was treated with 250 parts of water with external cooling to about 10°–20° C. and was then transferred to a separatory funnel along with two 150-part n-hexane rinses of the reaction flask. The water layer was discarded. The organic material was washed successively with 100 parts of water, four 30-part portions of concentrated $H_2SO_4$, 150 parts of water, 150 parts of 5% $Na_2CO_3$, and 100 parts of water. After being dried over $CaCl_2$, the solution of $C_{12}$ dichlorides was stripped of n-hexane, then distilled under reduced pressure to yield 111.0 parts (94 percent, based on glycols) of a mixture of 1,10-dichloro-3-ethyldecane (about 70 percent), 1,8-dichloro-3,6-diethyloctane (about 20 percent), and 1,12-dichlorododecane (about 10 percent) B.P. 145°–152° C./9 mm., $n_D^{25}$ 1.4650).

Elemental analysis:

|  | Percent C | Percent H | Percent Cl |
|---|---|---|---|
| Calculated for $C_{12}H_{24}Cl_2$ | 60.25 | 10.11 | 29.65 |
| Found | 60.27 | 10.09 | 29.59 |

Fractionation of the $C_{12}$ dichlorides under reduced pressure yielded pure 1,10-dichloro-3-ethyldecane, B.P. 131°–140° C./1 mm., $n_D^{25}$ 1.4665, and pure 1,8-dichloro-3,6-diethyloctane, B.P. 145°–146°/1 mm., $n_D^{25}$ 1.4639.

*Example II*

A three-necked reaction flask was charged with 54.5 parts (0.4 mole) of anhydrous zinc chloride. To this were added with shaking and cooling, 34.6 parts (0.4 mole) of concentrated hydrochloric acid. When the zinc chloride had dissolved, 20.2 parts (0.1 mole) of a mixture of saturated $C_{12}$ glycols, comprising approximately 20% of 3,6-diethyl-1,8-octanediol, 70% of 3-ethyl-1,10-decanediol, and 10% of 1,12-dodecanediol, prepared as in Example I, were added. The mixture was stirred under reflux, cooled to room temperature, and treated with 100 parts of water with external cooling to about 10°–20° C. After transfer to a separatory funnel, the organic layer was collected and combined with a single 50-part n-hexane extract of the aqueous layer. The material was then washed with two 50-part portions of water and dried overnight over $CaCl_2$. After being filtered free of $CaCl_2$, the solution was stripped of n-hexane and then distilled under pressure to yield 14.8 parts (62 percent, based on glycols) of a mixture of 1,10-dichloro-3-ethyldecane (about 70 percent), 1,8-dichloro-3,6-diethyloctane (about 20 percent), and 1,12-dichlorododecane (about 10 percent) (B.P. 140°–150° C./9 mm.).

*Example III*

A nitrogen-blanketed three-necked flask was charged with 50.0 parts of a mixture of saturated $C_{12}$ glycols, comprising approximately 20% of 3,6-diethyl-1,8-octanediol, 70% of 3-ethyl-1,10-decanediol, and 10% of 1,12-dodecanediol, prepared as in Example I. To this was added 53 parts of phosphorous tribromide with stirring over 90 minutes, while the temperature was held at 20°–30° C. by external cooling. After all of the phosphorous tribromide had been added, the mixture was stirred an additional 30 minutes and then allowed to stand for two days. The material was then cooled by pouring it onto ice and subsequently transferred to a separatory funnel. The organic product was taken up in 100 parts of n-hexane and the organic layer collected. The water layer was extracted once with n-hexane and then discarded. The combined organic material was then washed successively with water, two portions of 5% $Na_2CO_3$, and two portions of water. The hexane was removed by heat and suction and the residue distilled under reduced pressure to yield 64 parts (79 percent based on glycols) of a mixture of 1,10-dibromo-3-ethyldecane (about 70 percent), 1,8-dibromo-3,6-diethyloctane (about 20 percent), and 1,12-dibromododecane (about 10 percent) (B.P. 125°–140° C./1 mm.).

*Example IV*

A three-necked flask was charged with 24.5 parts (0.14 mole) of $C_{10}$ glycols (comprising about 10 percent 1,10-decanediol, about 15 percent 2,5-diethyl-1,6-hexanediol, and about 75 percent 2-ethyl-1,8-octanediol, prepared by a process corresponding to that used in Example I) and 3.4 parts of pyridine. Under a nitrogen atmosphere, 41 parts (0.56 mole) of thionyl chloride was added over 80 minutes with stirring, at which time the temperature was held at 25°–30° C. by external cooling. The mixture was then heated at 100°–110° C. for three hours, cooled, and poured onto crushed ice. It was then transferred to a separatory funnel; the organic layer was collected and combined with three 45-part n-hexane extracts of the aqueous layer. The organic solution was washed successively with 100 parts of water, two 100-part portions of 5% $Na_2CO_3$, and 100 parts of water. The solvent was removed by heat and suction. Distillation under reduced pressure yielded 28 parts (94 percent, based on glycols) of a mixture of 1,10-dichlorodecane (about 10 percent), 1,6-dichloro-2,5-diethylhexane (about 15 percent), and 1,8-dichloro-2-ethyloctane (about 75 percent); the mixture boiled at 130°–132° C./13 mm.

*Example V*

Into a three-necked reactor apparatus, there was placed 120 parts of $C_{12}$ glycol mixture and 1.5 parts of zinc chloride. A stream of anhydrous hydrogen chloride was passed into the system and the mixture was heated to reaction temperature. The reaction was continued until a substantial amount of distillate (30–40% HCl) was collected. The reaction mixture was then cooled, treated with about 50 parts of water and transferred to a gravity separation apparatus. The reaction vessel was rinsed with several portions of hexane and the combined organic layer separated and washed several times with water. The organic layer was filtered, the solvent removed by evaporation, and the residue distilled. The fraction boiling between 100°–120° C. (0.2 mm.) was collected as crude $C_{12}$ dichlorides.

These crude dichlorides were diluted with equal volume of hexane and washed several times with 10–25 parts of concentrated sulfuric acid. After the final sulfuric acid washing had been completed, the organic layer was washed with saturated sodium chloride solution and then with water. The organic layer was then filtered, the hexane solvent removed by evaporation, and the residue distilled. A fraction with a ten degree boiling range within the temperature range of 100°–120° C. (0.2 mm.) was collected as the pure $C_{12}$ dichloride.

*Example VI*

To a three-necked flask equipped with a paddle-type stirrer, a reflux condenser, a dropping funnel, and a thermometer were added 72 parts (1.8 moles) of sodium hydroxide in 75 parts of water and 58 parts (1.8 gram atoms) of sodium polysulfide. The mixture was stirred at about 95° C. for several hours; it was then diluted with water to 300 parts and treated with 1 part of magnesium hydroxide. The temperature was adjusted to about 70° C., and 120 parts (0.5 mole) of a mixture of saturated $C_{12}$ dichlorides, prepared as in Example II, was gradually introduced through the dropping funnel. After an additional period of stirring at about 70° C., the mixture was allowed to cool and settle overnight. The reaction mixture then consisted of a heavy liquid polysulfide polymer and a supernatant aqueous layer. The water solution was drawn off; the liquid rubber was stirred with 500 parts of water and then allowed to settle again before the water was removed. This washing procedure was repeated several times until the rinses were free of inorganic material. The salt-free product consisted of a dark, heavy liquid which, when treated with oxidants such as lead dioxide, led to solid rubbers. Such rubber products are potentially useful in gasketing, solvent storage and piping, lacquer and point fabrication, and in the manufacture of putties and cements.

*Example VII*

A mixture of 1.2 moles of $Na_2S_{2.25}$ and about 240–280 parts of methanol was treated in an autoclave equipped with mechanical stirrer, thermometer, and a dropping feed arrangement with about 7 parts of sodium alkylnaphthalene sulfonate solution (5% concentration), about 3 parts of NaOH solution (50% concentration), and about 20 parts of $MgCl_2$ solution (25% concentration) to produce a $Mg(OH)_2$ dispersion in the $Na_2S_{2.25}$. This mixture was heated to about 100° C. and the pressure adjusted to 200 p.s.i.

A mixture consisting of 0.7 mole of $C_{12}$ mixed dichlorides and 0.014 mole of 1,2,3-trichloropropane was added dropwise to the polysulfide solution over a period of thirty minutes. The total was finally held at 120° C. for four hours following feed. The latex thus obtained, after washing free of excess polysulfide, was still soft and was toughened twice using polysulfide. The first toughening required 725 parts of $Na_2S_{2.25}$ with heating at 160° C. under 200 p.s.i. for four hours. The second toughening was with 1486 parts of $Na_2S_{2.25}$ at 180° C. for four hours. The polymer thus obtained was washed free of polysulfide and coagulated.

*Example VIII*

1.2 moles of $Na_2S_{2.23}$ was poured through an inlet directly into the autoclave. With the agitator running, the following dispersants were added into the reactor autoclave:

| | Parts |
|---|---|
| Sodium alkylnaphthalene sulfonate, 5% | 7 |
| Sodium hydroxide, 50% | 3 |
| Magnesium chloride, 25% | 20 |

After the dispersants had been added, the agitator was turned off and the reactor sealed. A mixture of 0.98 mole of $C_{12}$ dibromides and 0.02 mole of 1,2,3-trichloropropane was added to the feed bomb and the reactor sealed with about 100 p.s.i. $N_2$ gas.

The heat and agitation were then started in the reactor. Feed rate was adjusted so as to extend feed period over a one-hour period. The feed was started when the temperature in the reactor reached 100° C. After the feed was completely added, the charging bomb was opened and refilled with methanol, resealed and repressured to 100 p.s.i. $N_2$. After twenty minutes at 100° C. the methanol was added, the temperature taken to 120° C., and the nitrogen pressure raised to 200 p.s.i. Three and one-half hours after the methanol was added, the reactor was cooled to room temperature. About 12 hours later 1.7 moles of $Na_2S_{2.23}$ was added to the autoclave and the mixture heated to 160° C. under 200 p.s.i. nitrogen pressure. After eight hours the product was taken out, washed twice and poured back into the autoclave. 2.4 moles $Na_2S_{2.23}$ was added and the temperature raised to 180° C. and held there for four hours at 200 p.s.i. No nitrogen was used. The reactor was cooled and the product drained off and washed free of sulfide. It was then put in an oven at 158° F. and on prolonged drying, dried to a soft rubber.

What is claimed is:

1. A mixture of organic dihalides comprising 1,12-dihalododecane, 1,8-dihalo-3,6-diethyloctane, and 1,10-dihalo-3-ethyldecane, the amount of 1,12-dihalododecane in the mixture being about 5 to about 20 percent, wherein the dihalo substituents are selected from the group consisting of dichloro and dibromo.

2. A mixture of organic dihalides comprising about 10 percent of 1,12-dihalododecane, about 20 percent of 1,8-dihalo-3,6-diethyloctane, and about 70 percent of 1,10-dihalo-3-ethyldecane, wherein the dihalo substituents are selected from the group consisting of dichloro and dibromo.

3. A mixture of organic dihalides and comprising 1,10-dihalodecane, 1,6-dihalo-2,5-diethylhexane, and 1,8-dihalo-2-ethyloctane, the amount of 1,10-dihalodecane in the mixture being about 5 to about 20 percent, wherein the dihalo substituents are selected from the group consisting of dichloro and dibromo.

4. 1,8-dichloro-3,6-diethyloctane.
5. 1,10-dichloro-3-ethyldecane.
6. 1,6-dichloro-2,5-diethylhexane.
7. 1,8-dichloro-2-ethyloctane.

References Cited in the file of this patent

UNITED STATES PATENTS

| 1,966,187 | Schirm | July 10, 1934 |
| 2,124,605 | Bousquet | July 26, 1938 |
| 2,817,686 | Lo Cicero et al. | Dec. 24, 1957 |

FOREIGN PATENTS

| 58,160 | Holland | Aug. 15, 1946 |
| 856,888 | Germany | Nov. 24, 1952 |
| 1,004,155 | Germany | Mar. 14, 1957 |

OTHER REFERENCES

Beilstein: S. 64–67, Erster band, vierte auflage (1928).
Brewster: Organic Chemistry, pp. 89, 90 (1948), Prentice-Hall, New York.
Groggins: Unit Processes in Organic Synthesis, pp. 224, 232, fourth ed. (1952), McGraw-Hill Book Co., Inc., New York.